June 24, 1969   TOMOKAZU KAZAMAKI ET AL   3,451,745
LARGE APERTURE SEVEN-LENS OBJECTIVE LENS SYSTEM
Filed Feb. 28, 1966

INVENTORS
TOMOKAZU KAZAMAKI
YASUO TAKAHASHI
BY Stanley Wolder
ATTORNEY

United States Patent Office 3,451,745
Patented June 24, 1969

3,451,745
LARGE APERTURE SEVEN-LENS OBJECTIVE LENS SYSTEM
Tomokazu Kazamaki and Yasuo Takahashi, Tokyo-to, Japan, assignors to Asahi Kogaku Kogyo Kabushiki Kaisha, Tokyo-to, Japan, a corporation of Japan
Filed Feb. 28, 1966, Ser. No. 530,418
Int. Cl. G02b 9/62, 1/00
U.S. Cl. 350—176          1 Claim

ABSTRACT OF THE DISCLOSURE

A large aperture objective lens system of focal length F includes seven successive lenses dimensioned and related to satisfy the following conditions:

$1.75 \leq N_1, N_2, N_5, N_6, N_7 \leq 1.85$
$1.65 \leq N_3 \leq 1.75$
$1.58 \leq N_4 \leq 1.75$
$F_{1,2} \geq F/1.55$
$F_{1,2,3} \leq F/0.32$
$F_{1,2,3,4,5} \geq F/0.35$
$F/0.65 \leq F_{1,2,3,4,5,6} \leq F/0.5$
$0.98 \geq N_4/N_5 \geq 0.85$
$0.4F \geq r_6 \geq 0.3F$
$0.8F \leq r_8 \leq 3.5F$
$0.85F \leq l \leq 1.2F$ wherein F1, 2 . . . n is the focal length of the first to the nth lens, $l$ is the length of the lens system and the confronting faces of the fourth and fifth lenses are joined to form a unit surface.

---

The present invention relates generally to improvements in lens systems and it relates particularly to an improved photographic objective lens system of large aperture.

Photographic objective lens systems of known Gaussion design, although they have been commonly employed, possess, with other conventional objective lens systems of wide aperture, many drawbacks and disadvantages. While in the Gaussion design lens systems of small aperture the aberrations are fairly well compensated, in lenses of large aperture great difficulties are encountered in balancing the aberrations including the residual coma. An increase in coma aberration is experienced with an increase in lens aperture and it has been a problem of long standing to eliminate such coma aberration increase with an increase in lens aperture.

It is, therefore, a principal object of the present invention to provide an improved optical lens system.

Another object of the present invention is to provide an improved photographic objective lens system.

Still another object of the present invention is to provide an improved large aperture photographic lens system in which the aberrations are highly corrected.

A further object of the present invention is to provide an improved large aperture photographic objective lens system of low residual coma aberration.

Still a further object of the present invention is to provide a large aperture photographic objective lens system of the above nature characterized by its high definition, flexibility, and adaptability.

Figure 1:
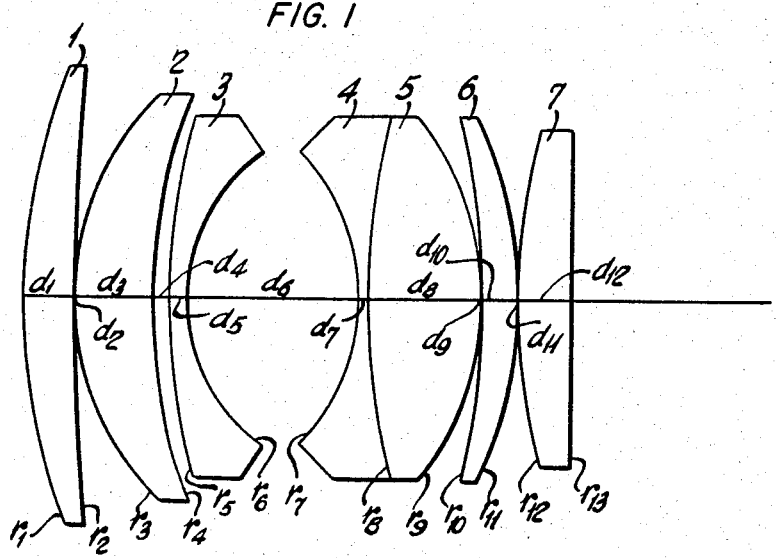
Figure 2A:
Figure 2B:
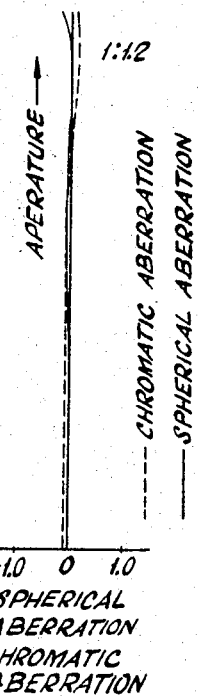
Figure 2C:
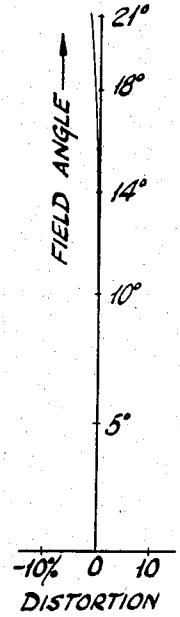
Figure 2D:
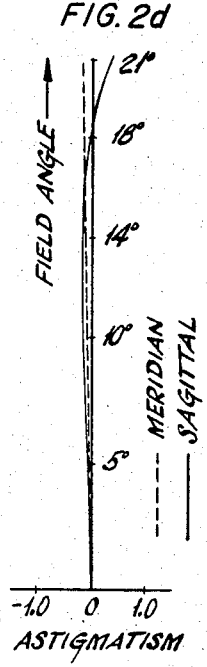

The above and other objects of the present invention will become apparent from a reading of the following description taken in conjunction with the accompanying drawing, wherein:

FIGURE 1 is a longitudinal sectional view of a photographic objective lens system embodying the present invention, and FIGURES 2(a), 2(b), 2(c) and 2(d) are sets of curves illustrating the spherical aberration and sine condition, the chromatic spherical aberration, the distortion, and the astigmatism of a lens system of FIGURE 1.

In a sense, the present invention contemplates the provision of an objective lens system of focal length F containing seven successively positioned lenses wherein the index of refraction of each of the first, second, fifth, sixth and seventh lenses is 1.75 to 1.85; the index of refraction of the third lens is 1.65 to 1.75; the index of refraction of the fourth lens is 1.58 to 1.75, the focal length of the first and second lenses is at least equal to F/1.55; the focal length of the first through the third lenses does not exceed F/0.32; the focal length of the first through the fifth lens is at least equal to F/0.35; the focal length of the first through the sixth lens is F/0.5 to F/0.65; the index of refraction of the fourth lens divided by the index of refraction of the fifth lens is 0.85 to 0.98; the radius of curvature of the rear face of the third lens is 0.3F to 0.4F; the radii of curvature of the rear face of the fourth lens and the front face of the fifth lens is 0.8F to 3.5F; and the length of the lens system is 0.85F to 1.2F.

According to a highly preferred form of the present lens system the first and second lenses are positive meniscus lenses having front faces of greater curvature than the rear faces, the third lens is a negative meniscus lens with a rear face of greater curvature, the fourth lens is a concave meniscus lens and the fifth lens is a double convex lens and cemented to the fourth lens along mating faces to form a unit or group, and the sixth and seventh lenses are positive.

Referring now to the drawing which illustrates a preferred embodiment of the present invention, the improved lens system consists of seven lenses forming six groups, the fourth and fifth lenses being cemented to form a unit group, and in the specific lens system hereinafter described in detail, the lens system has an aperture of 1:1.2 and an image angle of 42 degrees. The aberrations are so compensated as to be mutually highly balanced and the increase in coma aberration normally experienced with increased aperture is minimized or eliminated.

The improved lens system is a modification of the Gaussion design and includes first and second lenses 1 and 2, respectively, each of which is of a convex meniscus type, having a front face, that is, a face directed toward the object to be photographed of greater curvature than the respective rear face thereof. The third lens 3 is negative and of concave meniscus type and is somewhat spaced from the second lens 2 and its front face is of larger curvature than its rear face. Following the third lens 3 is arranged a fourth lens 4 of a concave meniscus type, a diaphragm being positioned between the third and fourth lenses. The fifth lens 5 is of double-convex type and is cemented to the fourth lens 4 along confronting mating faces to form a unit group. The sixth lens 6 may be of double-convex, plano-convex or convex meniscus type with its large curvature surface directed rearwardly. The seventh lens 7 is positive and of convex type. Thus the lens system consists of seven lenses forming six groups, the lense 4 and 5 constituting a single group.

It has been found that in the above described lens system the aberrations are compensated with excellent balance, one against the other, under the following parameters and relationships;

$1.75 \leq N_1, N_2, N_5, N_6, N_7 \leq 1.85$
$1.65 \leq N_3 \leq 1.75$
$1.58 \leq N_4 \leq 1.75$
$F_{1,2} \geq F/1.55$
$F_{1,2,3} \leq F/0.32$
$F_{1,2,3,4,5} \geq F/0.35$
$F/0.65 \leq F_{1,2,3,4,5,6} \leq F/0.5$
$0.98 \geq /N_4 N_5 \geq 0.85$
$0.4F \geq r_6 \geq 0.3F$
$0.8F \leq r_8 \leq 3.5F$
$0.85F \leq l \leq 1.2F$ wherein the lenses 1, 2 . . . 7 have corresponding refractive indices $N_1, N_2, \ldots N_7$, respectively, the focal length determined by the first through the $i$-th lenses are $F_1, _2 \ldots _i$, respectively, the focal length determined by the entire lens system is F, the radius of curvature of the $j$-th surface is $r_j$, and that the whole length of the lens system is $l$. The mating confronting faces of the fourth and fifth lenses is considered a unit surface and is designated as the 8th face or surface.

The condition $1.75 \leq N_1, N_2, N_5, N_6, N_7 \leq 1.85$ together with the conditions $F_{1,2} \geq F/1.55$, $F_{1,2,3} \leq F/0.32$ and $0.4F \geq r_6 \geq 0.3F$ renders the Petzval sum highly suitable for aberration balance. The condition $1.65 \leq N_3 \leq 1.75$ in association with the condition $0.4F \geq r_6 \geq 0.3F$ is effective in preventing an increase in coma aberration. In a similar manner, the condition $1.58 \leq N_4 \leq 1.75$ in association with the conditions $0.98 \geq N_4/N_5 \geq 0.85$ and $0.8F \leq r_8 \leq 3.5F$ serves to prevent an increase in coma aberration in the intermediate image angle area. Further the condition $1.58 \leq N_4 \leq 1.75$ in association with the aforementioned condition $1.75 \leq N_1, N_2, N_5, N_6, N_7 \leq 1.85$ prevents excessive compensation of spherical aberration of a higher order.

Selection of the focal length $F_{1,2}$ of the first to second lenses and the focal length $F_{1,2,3}$ of the first to the third lenses in relation to the whole resultant focal length F so as to satisfy the conditions $F_{1,2} \geq F/1.55$ and $F_{1,2,3} \leq F/0.32$ provides an adjustment of the Petzval sum and further assures the condition $0.4F \geq r_6 \geq 0.3F$. The conditions $F_{1,2,3,4,5} \geq F/0.35$ and $$F/0.65 \leq F_{1,2,3,4,5,6} \leq F/0.5$$

provide suitable power to the convex lenses arranged behind the diaphragm so as to prevent any excessive increase in aberration.

The regulating conditions $0.85F \leq l \leq 1.2F$ makes it possible to prevent a decrease in the light amount and an increase in the aberration in the lens system in most satisfactory manner.

The following table sets forth the parameters and relationships of a specific example of a photographic objective lens system according to the present invention having a focal length of 100 mm. and a relative aperture of 1:1.2:

| Lenses | Radii | Thickness and Separations | $N_d/\nu_d$ |
|---|---|---|---|
| $L_1$ | $r_1 = 110.000$ | $d_1 = 10.00$ | 1.80416/46.6 |
|  | $r_2 = 588.748$ | $d_2 = 0.20$ |  |
| $L_2$ | $r_3 = 51.600$ | $d_3 = 14.50$ | 1.79446/45.4 |
|  | $r_4 = 100.426$ | $d_4 = 3.50$ |  |
| $L_3$ | $r_5 = 119.000$ | $d_5 = 3.00$ | 1.71736/29.5 |
|  | $r_6 = 32.792$ | $d_6 = 32.50$ |  |
| $L_4$ | $r_7 = -36.500$ | $d_7 = 2.00$ | 1.68893/31.1 |
| $L_5$ | $r_8 = 131.500$ | $d_8 = 20.00$ | 1.77252/49.6 |
|  | $r_9 = -56.806$ | $d_9 = 0.20$ |  |
| $L_6$ | $r_{10} = -160.000$ | $d_{10} = 8.50$ | 1.77252/49.6 |
|  | $r_{11} = -74.352$ | $d_{11} = 0.20$ |  |
| $L_7$ | $r_{12} = 122.000$ | $d_{12} = 9.50$ | 1.77252/49.6 |
|  | $r_{13} = 2092.573$ |  |  |

The designations $d_1, d_2, \ldots d_{12}$ indicate the axial distances between successive lens faces and correspond respectively to the axial lens thicknesses and the axial spacing between confronting faces of successive lenses, $N_d$ indicates the refractive indices of the $d$-line, and $\nu_d$ indicates the Abbe number of the $d$-line, linear dimensions being given in millimeters.

The Seidel coefficients of the above example are as follows:

|  | $S_1$ | $S_2$ | $S_3$ | P | $S_5$ |
|---|---|---|---|---|---|
| 1 | 0.185 | 0.204 | 0.224 | 0.405 | 0.692 |
| 2 | 0.068 | −0.160 | 0.372 | −0.075 | −0.690 |
| 3 | 0.067 | 0.060 | 0.053 | 0.858 | 0.811 |
| 4 | 0.279 | −0.487 | 0.848 | −0.440 | −0.710 |
| 5 | −0.409 | 0.575 | −0.809 | 0.351 | 0.643 |
| 6 | −0.674 | −0.703 | −0.734 | −1.273 | −2.096 |
| 7 | −1.432 | −0.259 | −0.047 | −1.117 | −0.211 |
| 8 | 0.053 | 0.113 | 0.244 | 0.021 | 0.569 |
| 9 | 0.584 | 0.176 | 0.053 | 0.767 | 0.248 |
| 10 | −0.065 | 0.063 | −0.062 | −0.272 | 0.329 |
| 11 | 0.996 | 0.490 | 0.241 | 0.586 | 0.407 |
| 12 | 0.000 | 0.005 | −0.362 | 0.357 | 0.338 |
| 13 | 0.402 | −0.020 | 0.001 | −0.020 | 0.001 |
| Σ | 0.056 | 0.059 | 0.023 | 0.144 | 0.333 |

In the above table, $S_1$ indicates the spherical aberration, $S_2$ the coma, $S_3$ the astigmatism, P the Petzval sum, and $S_5$ the distortion.

As can be seen from the above table of Seidel coefficients and the aberration curves of FIGURES 2(a) to 2(d) a highly improved photographic objective lens system is achieved which is superior to and avoids the drawbacks of the conventional Gaussion design and other design lens systems of large aperture. The lens system of the above example has an image angle of 42 degrees, and the aberrations are highly compensated to provide an excellently balanced condition.

While there has been described and illustrated a preferred embodiment of the present invention, it is apparent that numerous alterations, omissions and additions may be made without departing from the spirit thereof.

What is claimed is:

1. An objective lens system of focal length F containing seven successively positioned lenses having the following approximate dimensions and relationships:

| Lenses | Radii | Thickness and Separations | $N_d/\nu_d$ |
|---|---|---|---|
| $L_1$ | $r_1 = 1.10000F$ | $d_1 = .1000F$ | 1.80416/46.6 |
| | $r_2 = 5.88748F$ | $d_2 = .0020F$ | |
| $L_2$ | $r_3 = .51600F$ | $d_3 = .1450F$ | 1.79446/45.4 |
| | $r_4 = 1.00426F$ | $d_4 = .0350F$ | |
| $L_3$ | $r_5 = 1.19000F$ | $d_5 = .0300F$ | 1.71736/29.5 |
| | $r_6 = .32792F$ | $d_6 = .3250F$ | |
| $L_4$ | $r_7 = -.36500F$ | $d_7 = .0200F$ | 1.68893/31.1 |
| $L_5$ | $r_8 = 1.31500F$ | $d_8 = .2000F$ | 1.77252/49.6 |
| | $r_9 = -.56806F$ | $d_9 = .0020F$ | |
| $L_6$ | $r_{10} = -1.60000F$ | $d_{10} = .0850F$ | 1.77252/49.6 |
| | $r_{11} = -.74352F$ | $d_{11} = .0020F$ | |
| $L_7$ | $r_{12} = 1.22000F$ | $d_{12} = .0950F$ | 1.77252/49.6 |
| | $r_{13} = 20.92573F$ | | | wherein the fourth and fifth lenses are cemented to form a unit group at a common interface designated $r_8$, $r_1 \ldots r_{13}$ designate the respectively subscripted radii of curvature of successive lens faces, $d_1 \ldots d_{12}$ designate the successive spacings between adjacent lens faces, and $L_1 \ldots L_7$ designate the successive lenses, $N_d$ designates the index of refraction of the $d$-line and $\nu_d$ designates the Abbe member of the $d$-line.

References Cited

UNITED STATES PATENTS 3,012,476  12/1961  Zimmermann et al. __ 350—176

JOHN K. CORBIN, *Primary Examiner.*

U.S. Cl. X.R.

350—215